United States Patent
Maggi et al.

(10) Patent No.: US 12,501,372 B2
(45) Date of Patent: Dec. 16, 2025

(54) METHOD AND APPARATUS FOR CONTROLLING RADIO EMISSIONS OF A BASE STATION

(71) Applicant: Nokia Solutions and Networks Oy, Espoo (FI)

(72) Inventors: Lorenzo Maggi, Paris (FR); Afef Feki, Sceaux (FR); Christophe Grangeat, Viroflay (FR)

(73) Assignee: Nokia Solutions and Networks Oy, Espoo (FI)

( * ) Notice: Subject to any disclaimer, the term of this patent is extended or adjusted under 35 U.S.C. 154(b) by 372 days.

(21) Appl. No.: 18/113,726

(22) Filed: Feb. 24, 2023

(65) Prior Publication Data
US 2023/0276375 A1    Aug. 31, 2023

(30) Foreign Application Priority Data

Feb. 25, 2022 (FI) ...................................... 20225175

(51) Int. Cl.
*H04W 52/36* (2009.01)
*H04W 52/22* (2009.01)

(52) U.S. Cl.
CPC ....... *H04W 52/362* (2013.01); *H04W 52/223* (2013.01); *H04W 52/226* (2013.01)

(58) Field of Classification Search
CPC ............. H04W 52/362; H04W 52/223; H04W 52/226; H04W 52/143; H04W 52/367;
(Continued)

(56) References Cited

U.S. PATENT DOCUMENTS

2016/0098053 A1*  4/2016  Khawand ............ H04W 52/362
                                                         307/116
2016/0219532 A1*  7/2016  Li ....................... H04W 52/545
(Continued)

FOREIGN PATENT DOCUMENTS

EP         2410661 A1      1/2012
EP         3745608 A1      12/2020
(Continued)

OTHER PUBLICATIONS

Tornevik, Christer, et al., "Time Average Power Control of a 4G or a 5G Radio Base Station for RF EMF Compliance", IEEE Access, vol. 8, Dec. 2020, 14 pages.
(Continued)

*Primary Examiner* — Lana N Le
(74) *Attorney, Agent, or Firm* — McCarter & English, LLP (57) ABSTRACT

Methods and apparatus are proposed for computing a power reduction policy to control radio emissions of a base station over a time window, with the objective to keep the time-averaged radio emissions over the time window below an authorized value set by regulations, with minimum impact on the performance of the overall system. The time window is subdivided into a plurality of time periods starting at a plurality of time steps, and the policy control comprises, at least at a first time step in the time window: generating a predicted average radio emissions over subsequent time periods in the time window, based on radio emissions historical data; finding couples of values of a power reduction factor and an average radio emissions that minimize a cost function for each time step in the time window, based on the predicted average radio emissions.

18 Claims, 7 Drawing Sheets

(58) Field of Classification Search
CPC ............... H04W 52/228; H04W 52/22; H04W 72/0446; H04W 24/06; H04B 17/3913; H04B 17/373; H04B 17/391; G06N 3/02; G06N 7/01; G06N 3/047; G06N 5/025; H04L 41/147; H04L 41/145; H04L 41/142

See application file for complete search history.

(56) References Cited

U.S. PATENT DOCUMENTS

| | | | |
|---|---|---|---|
| 2017/0064641 A1 | 3/2017 | Logan et al. | |
| 2017/0118686 A1* | 4/2017 | Fang | H04W 36/00835 |
| 2017/0171828 A1* | 6/2017 | Rao | H04W 52/283 |
| 2021/0051604 A1* | 2/2021 | Baracca | H04W 52/367 |
| 2021/0243701 A1* | 8/2021 | Hong | H04W 52/34 |
| 2022/0070795 A1* | 3/2022 | Nadakuduti | H04W 52/38 |
| 2024/0040521 A1* | 2/2024 | Fu | H04W 52/245 |

FOREIGN PATENT DOCUMENTS

| | | |
|---|---|---|
| WO | WO-2018/002691 A1 | 1/2018 |
| WO | WO-2021/023375 A1 | 2/2021 |
| WO | WO-2021/069953 A1 | 4/2021 |
| WO | WO-2021/220036 A1 | 11/2021 |
| WO | WO 2022/008962 A1 | 1/2022 |

OTHER PUBLICATIONS

Wigren, T. et al., "Coordinated Average EIRP Control of Radio Transmitters for EMF Exclusion Zone Computation," IEEE Wireless Communications Letters, vol. 10, No. 9, Sep. 2021.

* cited by examiner

METHOD AND APPARATUS FOR CONTROLLING RADIO EMISSIONS OF A BASE STATION

TECHNICAL FIELD

Various example embodiments relate generally to methods and apparatus for controlling radio emissions of a base station, including computing a power reduction policy and implementing the power reduction policy at the base station to control the radio emissions of the base station.

In particular, they apply to a Radio Access Network (RAN) of a mobile communication system, for example a 5G (fifth generation) system using the 5G NR (New Radio) as radio access technology (RAT) defined by 3GPP.

BACKGROUND

To address the increasing demand for mobile network capacity and coverage, 5G uses advanced antenna technologies and new allocated frequency bands. Regulations have been established setting limits to human exposure to radio frequency emissions. These limits must be met by radio equipment whatever the radio technology, particularly radio base stations in the radio access networks.

For example, international guidelines like ICNIRP specify maximum exposure levels to be met over time windows of 6 or 30 minutes. In addition, national regulations may also apply. Some of them specify limits over much longer time windows. For example, Italian regulation specifies maximum exposure levels to be met over a time window of 24 hours.

Solutions that are currently available provide satisfaction on relatively short time windows. But they are not directly applicable when considering longer averaging time windows, leading to overly high reductions of radio emissions and hence overly low traffic performance.

There is a need for a solution for controlling the radio emissions of base stations in radio access networks which provide an optimized control of radio emissions with minimum impact on the system throughput over any length of time window.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, an apparatus is disclosed for computing a power reduction policy to control radio emissions of a base station over a time window subdivided into a plurality of time periods starting at a plurality of time steps, the apparatus comprising means for, at least at a first time step in the time window:
  generating a prediction of averaged radio emissions over subsequent time periods in the time window, based on radio emissions historical data;
  finding couples of values of a power reduction factor and an average of radio emissions that minimize a cost function for each time step in the time window, based on the prediction of averaged radio emissions.

According to a second aspect, a method is disclosed for computing a power reduction policy to control radio emissions of a base station over a time window subdivided into a plurality of time periods starting at a plurality of time steps, the method comprising, at least at a first time step in the time window:
  generating a prediction of averaged radio emissions over subsequent time periods in the time window, based on radio emissions historical data;
  finding couples of values of a power reduction factor and an average of radio emissions that minimize a cost function for each time step in the time window, based on the prediction of averaged radio emissions.

In an embodiment of the disclosed apparatus or method for computing a power reduction policy, generating the prediction of averaged radio emissions over subsequent time periods in the time window is further based on an average of radio emissions measured over the previous time period in the time window.

In an embodiment of the disclosed apparatus and method for computing a power reduction policy generating a prediction of averaged radio emissions over subsequent time periods in the time window, and finding couples of values of a power reduction factor and average of radio emissions that minimize a cost function for each time step in the time window, are repeated at each time step in the time window.

In an embodiment of the disclosed apparatus and method for computing a power reduction policy, wherein, the cost function is based on:
  a first auxiliary function (h) applicable to the average of radio emissions to penalize more radio emissions being farther from an authorized value, and
  a second auxiliary function (g) applicable to the power reduction factor to penalize high power reduction factors and smooth out the power reduction factors over time.

In an embodiment of the disclosed apparatus and method for computing a power reduction policy, finding couples of values of a power reduction factor and average of radio emissions that minimize a cost function for a given time step in the time window comprises, for each given average of radio emissions in a set of possible values of average of radio emissions:
  for each time step starting from the last time step in the time window until the given time step, iteratively backward computing the value of the cost function for the time step for a set of possible values of power reduction factor, and selecting the power reduction factor that minimizes the cost function,
  storing the selected power reduction factors for the given time step in association with the given average of radio emissions.

In an embodiment, the method for computing a power reduction policy comprises sending the power reduction policy to the base station.

According to a third aspect, a base station is disclosed comprising means for obtaining a power reduction policy from an apparatus as disclosed above and means for implementing the power reduction policy during a given time period starting at a given time step based on the radio emissions averaged over the time window at the given time step.

In an embodiment, the disclosed base station further comprises an apparatus as disclosed above for computing a power reduction policy.

According to a fourth aspect, a method is disclosed for controlling radio emissions of a radio base station based on a power reduction policy computed as disclosed above, the method comprising:

obtaining the power reduction policy, and implementing the power reduction policy during a given time period starting at a given time step based on the radio emissions averaged over the time window at the given time step.

In a first embodiment of the base station and the method for controlling radio emissions of a radio base station, implementing the power reduction policy comprises:

retrieving a power reduction factor from the power reduction policy based on the given time step and the radio emissions averaged over the time window at the given time step, applying the retrieved power reduction factor during the given time period.

In a second embodiment of the base station and the method for controlling radio emissions of a radio base station, implementing the power reduction policy comprises:

retrieving a power reduction factor from the power reduction policy based on the given time step and the radio emissions averaged over the time window at the given time step, converting the retrieved power reduction factor into a radio emission constraint, and ensuring that the radio emissions averaged over the given time period remains under the radio emission constraint.

In a fifth aspect, a central entity is disclosed for use in a radio access network comprising at least one base station, the central entity comprising an apparatus as disclosed above for computing a power reduction policy and means for sending the power reduction policy to the base station.

In an embodiment, the central entity and the method for computing a power reduction policy comprise means for collecting the radio emissions historical data from all base stations in the radio access network.

In sixth aspect, a computer program product is disclosed comprising a set of instructions which, when executed on an apparatus, is configured to cause the apparatus, the base station or the central entity to carry out a method as disclosed herein.

Generally, the means referred to above in relation to the apparatus, the base station and the central entity include circuitry configured to perform one or more or all steps of the method for computing the power reduction policy and the method for controlling radio emissions of a radio base station based on the computed power reduction policy.

The means may include at least one processor and at least one memory including computer program code, wherein the at least one memory and the computer program code are configured to, with the at least one processor, cause the apparatus, the base station or the central entity to perform one or more or all steps of the methods disclosed herein.

BRIEF DESCRIPTION OF THE DRAWINGS

Example embodiments will become more fully understood from the detailed description given herein below and the accompanying drawings, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

The present disclosure applies the control of radio emissions in general. Various quantities may be controlled by using the disclosed apparatus, base station, central entity and methods, for example power or EIRP (Equivalent Isotropic Radiated Power—which combines power and gain). In the following of the description, we will refer to EIRP by way of example. This is not limitative.

Figure 1:
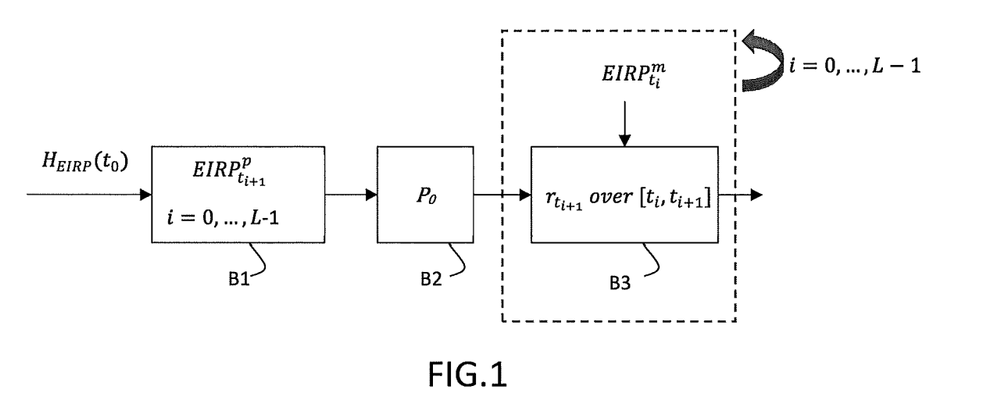
FIG. 1 is a block diagram representing a method for controlling radio emissions a first embodiment.
Figure 2:
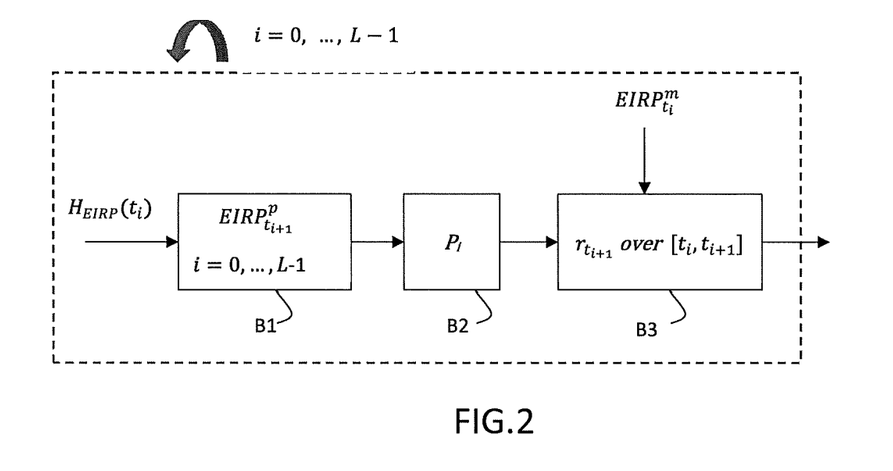
FIG. 2 is a block diagram representing a method for controlling radio emissions in a second embodiment.

FIG. 1 and FIG. 2 show two variants of a method for controlling radio emissions. In both variants a power reduction policy is computed to control the average EIRP of a base station over a time window [0, T]. The time window [0, T] is subdivided into a plurality of time periods $[t_i, t_{i+1}]$ starting at a plurality of time steps $t_i$ with i=0, ..., L−1. For example, the time window may have a length of 24 hours and the time periods may have a length of 3 or 6 hours each.

The method comprises a prediction block B1, a policy computation block B2 and a power reduction block B3. Prediction block B1 retrieves, at least at time step $t_0$, EIRP historical data $H_{EIRP}(t_0)$ and predicts an average EIRP value $EIRP_{t_{i+1}}^P$ with i=0, . . . , L−1 over each subsequent time periods $[t_0, t_1], \ldots, [t_i, t_{i+1}], \ldots, [t_{L-1}, t_L]$.

The policy computation block B2 computes a power reduction policy P that maps average EIRP values with values of power reduction factors for each time step $t_i$ in the time window.

The power reduction block B3 obtains the power reduction policy P. For a given time step $t_i$, block B3 retrieves from policy P the power reduction factor $r_{t_{i+1}}$ which corresponds to the measured average EIRP at time $t_i$. Block B3 controls the actual EIRP during the time period $[t_i, t_{i+1}]$ based on the retrieved power reduction factor $r_{t_{i+1}}$.

In the embodiment of FIG. 1, the prediction at block B1 and the computation of the power reduction policy at block B2 are performed only at the beginning of the time window, that is at the first time step $t_0$. At time step $t_0$ a power reduction policy $P_0$ is computed for each time step $t_i$, i=0, . . . , L−1 in the time window. This policy $P_0$ is applied by block B3 during the whole time window [0, T].

In the embodiment of FIG. 2, the power reduction policy is recomputed at several time steps $t_i$ in the time window. For example, at each time step $t_i$, block B1 predicts an average EIRP value over each subsequent time periods $[t_i, t_{i+1}], \ldots, [t_{L-1}, t_L]$. And block B2 computes a refreshed power reduction policy $P_i$ for each time step $t_k$, k=i, . . . , L−1.

Figure 3:
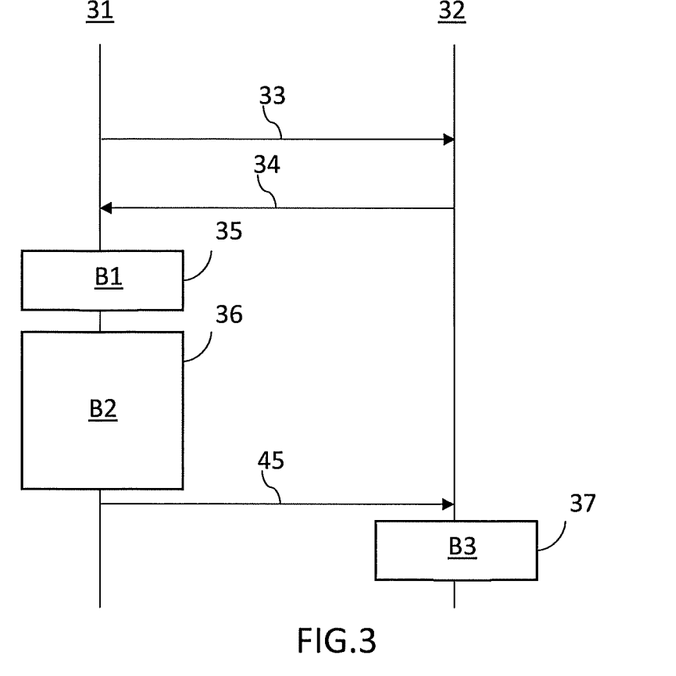
FIG. 3 is an example of implementation in a radio access network of a method for controlling radio emissions as depicted in FIG. 1 and FIG. 2.

FIG. 3 is an exemplary implementation of a method for controlling radio emissions in a radio access network 30 comprising a central entity 31 and a plurality of base stations 32. For example, the central entity can be a RIC (Radio Intelligent Controller) or a CSON entity (Central Self Organizing Network).

In the example depicted in FIG. 3, blocks B1 and B2 are implemented in the central entity 31 whereas block B3 is implemented in the base stations 32.

At step 33, the central entity 31 requests EIRP measurements to the base stations 32. At step 34, the base stations 32 respond by sending their EIRP historical data. At step 35, the central entity 31 performs the EIRP prediction of block B1. At step 36, the central entity 31 performs the policy computation of block B2. At step 37, the central entity 31 sends the power reduction policy P obtained at step 36 to the base stations 32. At step 38, the base stations 32 perform the power reduction of block B3 based on the received power reduction policy P.

For example, historical data $H_{EIRP}(t_i)$ sent by the base stations 32 at time step $t_i$ includes:
average EIRP measured at the same time of the day on previous days;
average EIRP measured over the previous time period $[t_{i-1}, t_i]$ for i=1, . . . , L−1.

Advantageously the central entity 31 receives EIRP historical data from a plurality of base stations in the radio access network which improves the prediction and the performance of the power reduction policy. In this embodiment, a significant quantity of data needs to be transmitted between the central entity 31 and the base stations 32. This can be mitigated by reducing the frequency at which the power reduction policy is recomputed by the central entity 31 or, when the policy is recomputed at each time step, by increasing the duration of the time periods.

For example, when the central entity is a RIC, data are transmitted between the central entity 31 and the base stations 32 over an E2 interface.

As an alternative to the embodiment depicted in FIG. 3, all three blocks B1, B2, B3 may be implemented in the base stations. In this case, the base stations perform block B1 prediction based on their own historical data only.

The EIRP prediction of block B1 may be performed by using prediction techniques known in the art, for example linear regression or neural network-based prediction.

The computation of the power reduction policy performed at block B2 will now be described by reference to FIG. 4A and FIG. 4B, and FIG. 5.

The objective of the power reduction policy is to keep the average EIRP over the time window [0, T] below an authorized value $M_T$ set in the regulations, with minimum impact on the performance of the overall system.

As explained above, the power reduction policy maps average EIRP values with values of power reduction factors for each time step $t_i$ in the time window. The above objective is achieved by finding, for each time step $t_i$ in the time window, couples of values $\{r_{t_i}, EIRP_{t_i}\}$ of power reduction factors and average EIRP that minimize a cost function C.

Preferably, the policy shall avoid overshooting with $EIRP_{t_i}(r_{t_i})$ values too low from the authorized value $M_T$. It shall also avoid enforcing high power reduction factor at all time.

To this aim the cost function C is based on two auxiliary functions h and g. The first auxiliary function h applies to the average EIRP and is defined to penalize more radio emissions that are farther from an authorized value $M_T$. The second auxiliary function g applies to the power reduction factor and is defined to penalize high power reduction factors and to smooth out the power reduction factors over time.

Figure 4A:
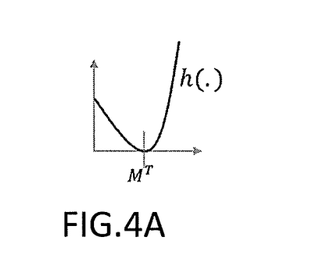
FIG. 4A and FIG. 4B are representations of an example of a first and respectively a second auxiliary function.
Figure 4B:
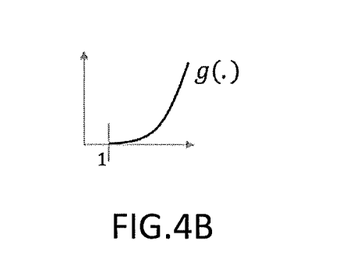
Figure 5:
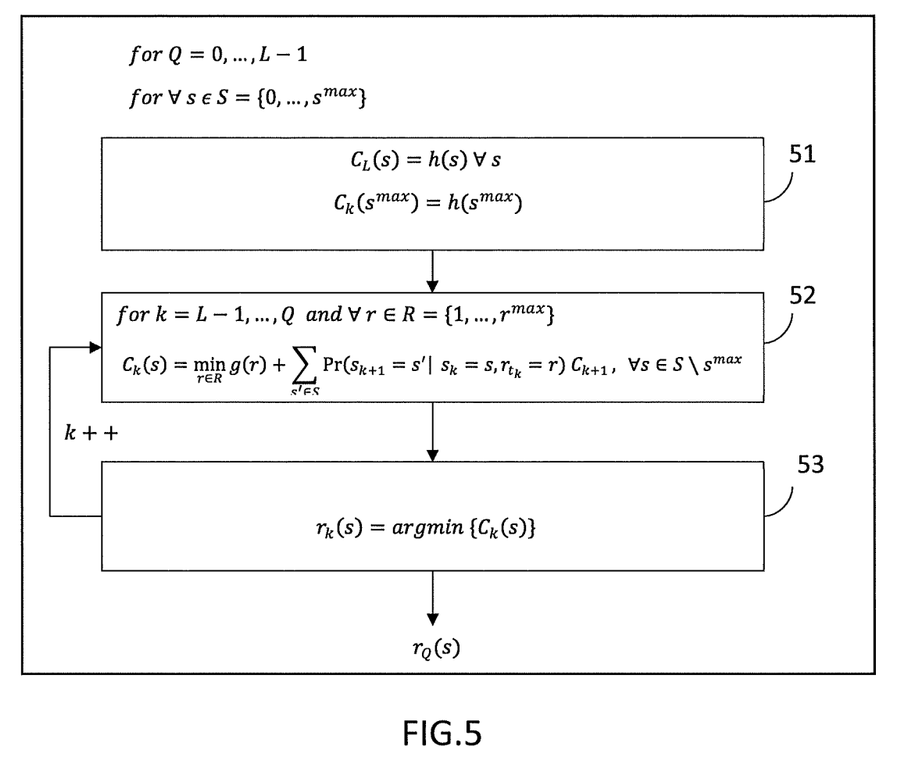
FIG. 5 is a flow chart of a method for computation a power reduction policy based on dynamic programming.

FIG. 4A gives an example of a first auxiliary function h and FIG. 4B gives an example of a second auxiliary function g.

For example, a first auxiliary function h as depicted in FIG. 4A can be defined as follows:

$$h(x) = a_1|x - M_T|^{n_1} + b_1|x - M_T| \text{ for } x > M_T, \text{ and}$$

$$h(x) = a_2|x - M_T|^{n_2} + b_2|x - M_T| \text{ for } x < M_T$$

where $a_1 > a_2$ and $b_1 > b_2$ and $n_1 > n_2 \geq 1$ to penalize violation of the authorized value $M_T$ more than an excessive EIRP reduction.

For example, a second auxiliary function g as depicted in FIG. 4B can be defined as follows: $g(r) = c(r-1)^n$ where c>0, n>1.

The power reduction policy can be computed by using a mathematical optimization method, for example dynamic programming as will be described in more details below by reference to FIG. 5.

$EIRP_{t_i}(r_{t_i})$ denotes the reduced EIRP at time step $t_i$ obtained by applying the power reduction factor $r_{t_i}$ retrieved from the power reduction policy, to the EIRP averaged over the time period $[t_i, t_{i+1}]$:

$$EIRP_{t_i}(r_{t_i}) = \frac{EIR_{t_i}}{r_{t_i}}.$$

$s_k$ denotes the weighted average EIRP up to time $t_k$ with $s_k = \sum_{i=1}^{k} \omega_i EIRP_{t_i}(r_{t_i})$ where $\omega_i$ is the relative length of the time period $[t_i, t_{i+1}]$:

$$\omega_i = \frac{t_{i+1} - t_i}{T}.$$

The set of possible values of weighted average EIRP is denoted $S = \{0, \ldots, s^{max}\}$, And the set of possible values of power reduction factors is denoted $R=\{1, \ldots, r^{max}\}$ The objective is to find the couples of values $\{r,s\}$, $r \in R$, $s \in S$ that minimize the cost function C for a given time step Q in the time window.

This is achieved with the method described below by reference to FIG. 5. Steps 51 to 53 in FIG. 5 are executed for each values in the set $S=\{0, \ldots, s^{max}\}$ of possible values of weighted average EIRP.

At step 51 the cost function C is first initialized: $C_L(s)=h$ (s) $\forall$ s and $C_k(s^{max})=h(s^{max})$. Then the problem is resolved by backward computation.

Steps 52 and 53 is executed for each time step $t_k$ with $k=L-1, \ldots, Q$.

At step 52 the cost function $C_k(s)$ is calculated for the values r in the set $R=\{1, \ldots, r^{max}\}$ of possible values of power reduction factor.

$$C_k(s) = \min_{r \in R} g(r) + \sum_{s' \in s} Pr(s_{k+1} = s' \mid s_k = s, r_{t_k} = r) C_{k+1}, \forall s \in S \setminus s^{max}$$

At step 53, the power reduction factor $r_k(s)=\text{argmin}\{C_k(s)\}$ is calculated. The value $r_k(s)$ is the value that minimize the cost function $C_k(s)$.

Then variable k is incremented and the method repeats at step 52 until k=Q. When k=Q, the final value $r_Q(s)$ is output and stored in association with the corresponding value s of weighted average EIRP.

The process described at step 51 to 54 is repeated for each time step in the time window, that is for $Q=0, \ldots, L-1$.

Figure 6:
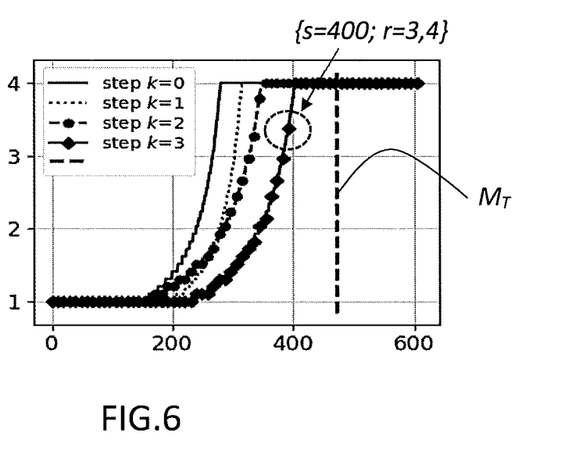
FIG. 6 is a graph representing a power reduction policy obtained with a method as disclosed herein.

For example, the resulting policy P can be stored in a table which comprises for each value of Q (that is for each time step $t_Q$), couples of values $\{r,s\}$ that minimize the cost function C. FIG. 6 gives an example of a power reduction policy obtained with the method described above. In FIG. 6 the policy is depicted for time steps $t_0, \ldots, t_3$. The weighted average EIRP s is represented on the x-axis and the power reduction factor r is represented on the y-axis. For example, if at time step $t_3$, the weighted average EIRP value is s=400 W, then the power reduction ratio obtained from the policy is $r_{t_3}=3,4$.

As previously explained by reference to FIGS. 1 and 2, block B3 controls the actual EIRP during the time period $[t_i, t_{i+1}]$ based on the retrieved power reduction factor $r_{t_{i+1}}$.

In a first embodiment the actual EIRP is controlled by applying the retrieved power reduction factor directly during the entire duration of the time period $[t_i, t_{i+1}]$. In practice this may be achieved by reducing utilization of the Physical Resource Block (PBR) by the constant factor $r_{t_{i+1}}$ during the whole time period $[t_i, t_{i+1}]$. Reducing the PBR means that transmission is only allowed for a portion $1/r_{t_{i+1}}$ of the available PBRs while the remaining PBRs are blanked out.

Figure 7:
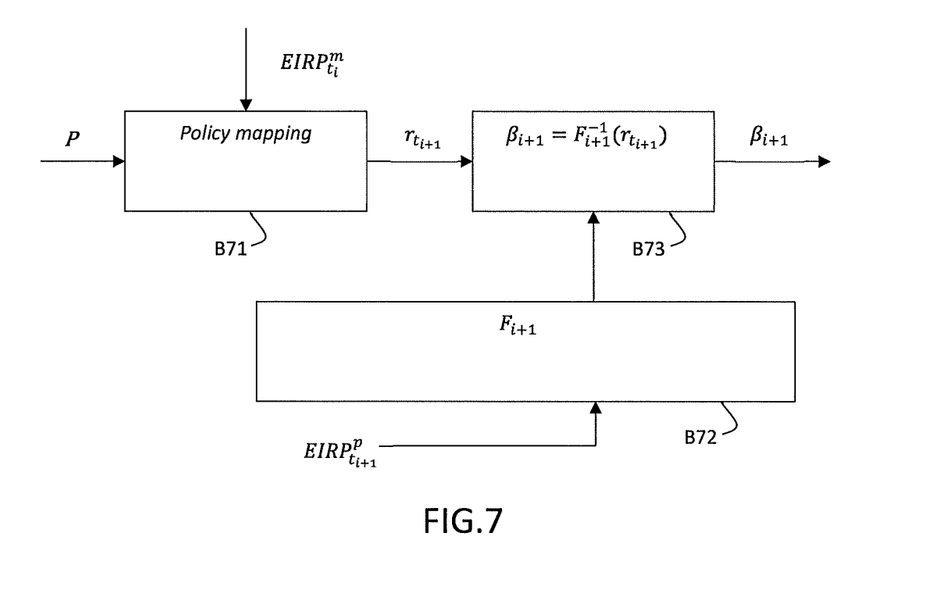
FIG. 7 is a block diagram of a method for reducing power based on a power reduction policy in an exemplary embodiment.

A second embodiment is based on the solution described in WO2021/023375 which controls the actual EIRP values exceeding an EIRP constraint $\beta_{i+1}$ over the time period $[t_i, t_{i+1}]$. With this approach, the constraint $\beta_{i+1}$ needs first to be obtained from the power reduction factor $r_{t_{i+1}}$. FIG. 7 shows a detailed representation of block B3 with this second approach. At block B71, the power reduction factor $r_{t_{i+1}}$ is retrieved from the policy, based on the value of the EIRP averaged during $[t_0, t_i]$. Block B72 receives the EIRP predicted over the time period $[t_i, t_{i+1}]$ and computes a function $F_{i+1}$ that maps the EIRP constraint $\beta_{i+1}$ to an effective power reduction factor. And block B73 inverts function $F_{i+1}$ to compute the EIRP constraint $\beta_{i+1}$ from the value $r_{t_{i+1}}$ retrieved by block 71 so that $\beta_{i+1}=F_{i+1}^{-1}(r_{t_{i+1}})$. Then the base station ensures that the power averaged over the time period $[t_i, t_{i+1}]$ remains under the constraint $\beta_{i+1}$ for example by using the method disclosed in WO2021/023375.

In the following, $F_i(\beta_i)$ is referred to as equivalent EIRP reduction factor.

Under NGBR traffic, it can be assumed that any blanked-out PRB is lost, which means that it does not generate an increase of EIRP over the next slots. In this case, the actual EIRP with power reduction can be approximated as the minimum between $\beta_{i+1}$ and the actual EIRP without power reduction Based on this assumption the equivalent EIRP reduction factor $F_{i+1}(\beta_{i+1})$ can be computed analytically as follows:

$$F_{i+1}(\beta_{i+1}) = \frac{\mu_{i+1}}{\mu'_{i+1}(\beta_{i+1})}$$

where $\mu_{i+1}$ is the predicted EIRP over the time period $[t_i, t_{i+1}]$ when no control is applied (that is without power reduction) and $\mu'_{i+1}(\beta_{i+1})$ is minimum between $\beta_{i+1}$ and the predicted EIRP without power reduction, over the time period $[t_i, t_{i+1}]$.

Figure 8A:
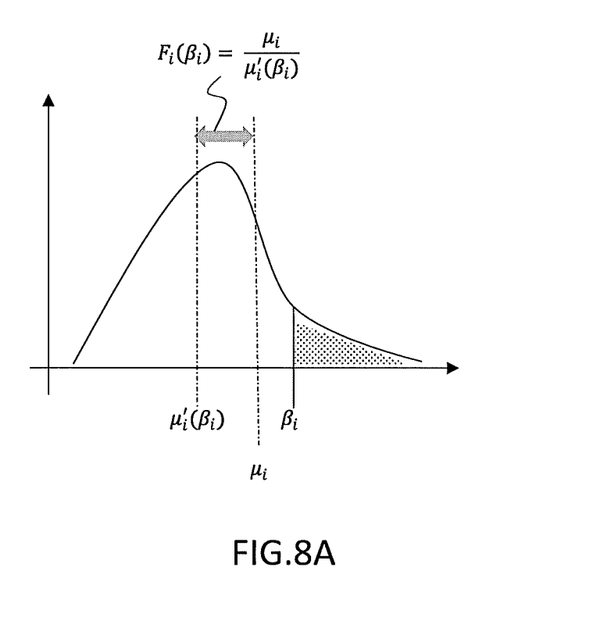
FIG. 8A and FIG. 8B represent the distribution of the radio emissions over a time period.

In the above-described embodiment, as illustrated in FIG. 8A, it is assumed that the power control clips EIRP values higher than the constraint $\beta_{i+1}$ to exactly $\beta_{i+1}$ while the remaining part of the distribution remains unchanged.

Figure 8B:
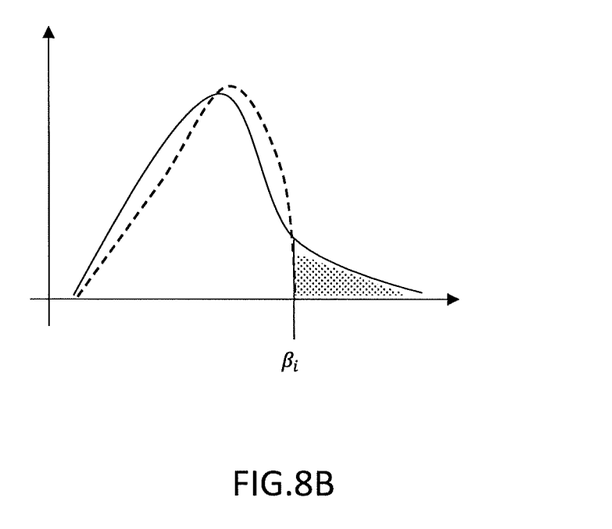

However if the majority of the traffic is GBR and/or if the constraint $\beta_{i+1}$ has a sufficiently low value, this approximation may not hold in practice. In this case, blanked-out PRBs may reappear in the upcoming future for packet retransmission. This means that the EIRP distribution is not only clipped when it exceeds the constraint $\beta_{i+1}$ as represented in FIG. 8A but the power control also changes the shape of the EIRP distribution as illustrated in FIG. 8B. In this case, advantageously, the equivalent EIRP reduction factor, $F_{i+1}(\beta_{i+1})$ is learned offline (that is prior to the deployment of the power control). With this offline learning approach, different values of the constraint $\beta_{i+1}$ are deployed within the same time period $[t_i, t_{i+1}]$ but possibly over different days, and the equivalent EIRP reduction factor $F_{i+1}(\beta_{i+1})$ is computed directly from measurements, instead of being obtained from pure calculations as in the analytical approach described above.

Figure 9:
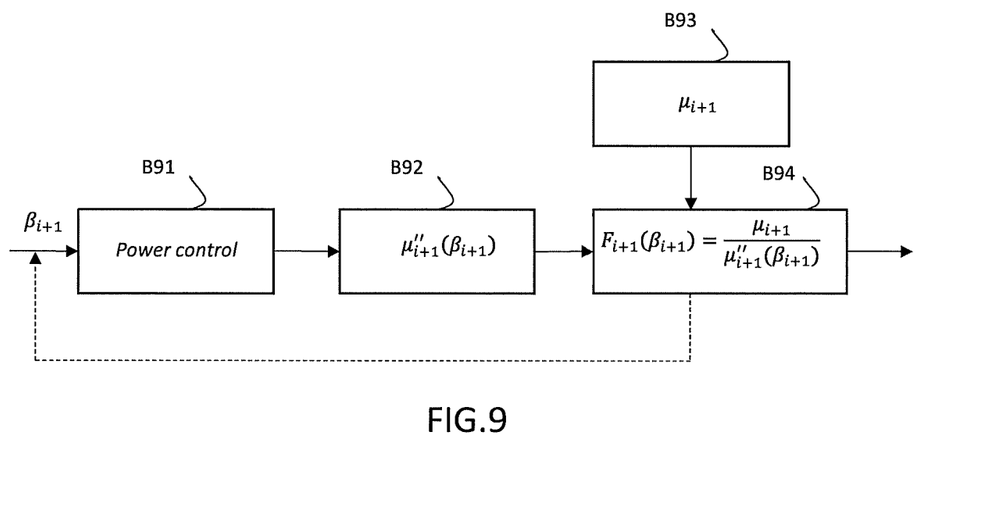
FIG. 9 is a block diagram illustrating the learning of the equivalent EIRP reduction factor.

FIG. 9 is a block diagram illustrating the offline learning of the equivalent EIRP reduction factor $F_{i+1}(\beta_{i+1})$. At block B91 power control is applied based on the constraint $\beta_{i+1}$. Then at block B92 the average EIRP over the time period $[t_i, t_{i+1}]$ denoted $\mu''_{i+1}(\beta_{i+1})$ is computed. At block B93, $\mu_i$, the predicted EIRP over the time period $[t_i, t_{i+1}]$, is computed and at block B94 the equivalent EIRP reduction factor $F_{i+1}(\beta_{i+1})$ is obtained:

$$F_{i+1}(\beta_{i+1}) = \frac{\mu_{i+1}}{\mu''_{i+1}(\beta_{i+1})}.$$

Finally the value of the constraint $\beta_{i+1}$ is adjusted as indicated by arrow 95.

Figure 10:
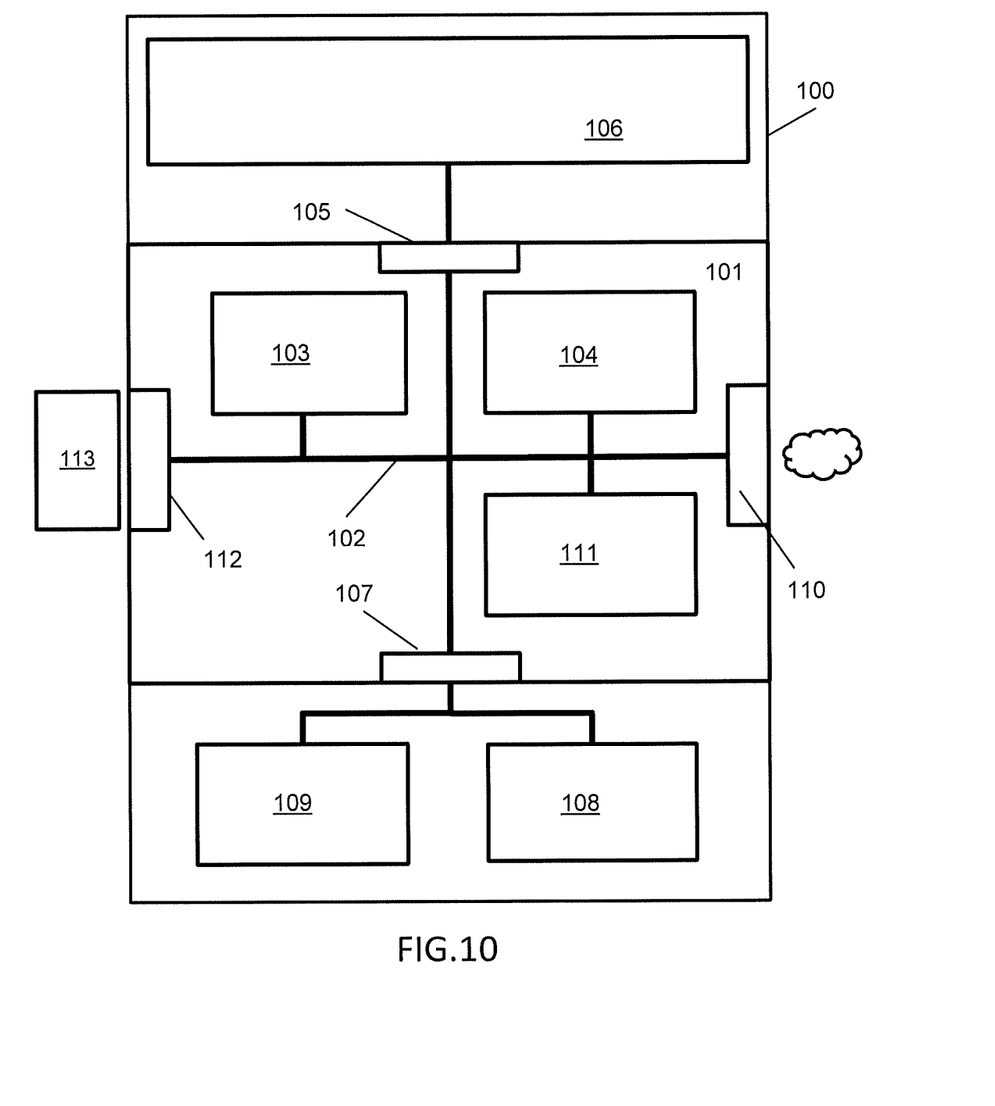
FIG. 10 is a schematic diagram of an example embodiment of an apparatus suitable for implementing a first base station and a device hosting a central entity as disclosed herein.

FIG. 10 depicts a high-level block diagram of an apparatus 100 suitable for implementing various aspects of the disclosure. Although illustrated in a single block, in other embodiments the apparatus 100 may also be implemented using parallel and distributed architectures. Thus, for example, various steps such as those illustrated in the system and methods described above by reference to FIG. 1 to 9 may be executed using apparatus 100 sequentially, in parallel, or in a different order based on particular implementations.

According to an exemplary embodiment, depicted in FIG. 10, apparatus 100 comprises a printed circuit board 101 on which a communication bus 102 connects a processor 103 (e.g., a central processing unit "CPU"), a random access memory 104, a storage medium 111, an interface 105 for connecting a display 106, a series of connectors 107 for connecting user interface devices or modules such as a mouse or trackpad 108 and a keyboard 109, a wireless network interface 110 and a wired network interface 112. Depending on the functionality required, the apparatus may implement only part of the above. Certain modules of FIG. 10 may be internal or connected externally, in which case they do not necessarily form integral part of the apparatus itself. For example display 106 may be a display that is connected to the apparatus only under specific circumstances, or the apparatus may be controlled through another device with a display, i.e. no specific display 106 and interface 105 are required for such an apparatus. Memory 111 contains software code which, when executed by processor 103, causes the apparatus 100 to perform the methods described herein. Storage medium 113 is a detachable device such as a USB stick which holds the software code which can be uploaded to memory 111.

The processor 603 may be any type of processor such as a general purpose central processing unit ("CPU") or a dedicated microprocessor such as an embedded microcontroller or a digital signal processor ("DSP").

In addition, apparatus 100 may also include other components typically found in computing systems, such as an operating system, queue managers, device drivers, or one or more network protocols that are stored in memory 111 and executed by the processor 103.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure as determined based upon the claims and any equivalents thereof.

For example, the data disclosed herein may be stored in various types of data structures which may be accessed and manipulated by a programmable processor (e.g., CPU or FPGA) that is implemented using software, hardware, or combination thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, and the like represent various processes which may be substantially implemented by circuitry.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, block denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used herein, the term "and/or," includes any and all combinations of one or more of the associated listed items.

When an element is referred to as being "connected," or "coupled," to another element, it can be directly connected or coupled to the other element or intervening elements may be present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. An apparatus, the apparatus comprising:
   at least one processor; and
   at least one memory storing instructions that, when executed with the at least one processor, cause the apparatus to, for radio emissions of a base station over a time window subdivided into a plurality of time periods, each time period starting at a corresponding time step, and at least for a first time step that starts a first time period in the time window, perform:
generating a prediction of averaged radio emissions over subsequent time periods that are subsequent to the first time period in the time window, based on radio emissions historical data, wherein the generating the prediction of averaged radio emissions over the subsequent time periods in the time window is further based on an average of radio emissions measured over a previous time period; and
finding couples of values of a power reduction factor and the average of radio emissions that minimize a cost function for the first time step in the time window, based on the prediction of averaged radio emissions.

2. A method comprising, for radio emissions of a base station over a time window subdivided into a plurality of time periods, each time period, and at least for a first time step that starts a first time period in the time window:
generating a prediction of averaged radio emissions over subsequent time periods that are subsequent to the first time period in the time window, based on radio emissions historical data, wherein the generating the prediction of averaged radio emissions over the subsequent time periods in the time window is further based on an average of radio emissions measured over a previous time period; and
finding couples of values of a power reduction factor and the average of radio emissions that minimize a cost function for the first time step in the time window, based on the prediction of averaged radio emissions.

3. A method for controlling radio emissions of a radio base station based on a power reduction policy computed with the method as claimed in claim 2, comprising:
obtaining the power reduction policy, and
implementing the power reduction policy during the time period starting at a given time step based on the radio emissions averaged over the time window at the given time step.

4. The method as claimed in claim 2, further comprising obtaining a power reduction policy based at least on the generating the prediction and the finding couples of values, and sending the power reduction policy to the base station.

5. The method as claimed in claim 2, further comprising performing the generating the prediction of the averaged radio emissions over the subsequent time periods in the time window, and the finding couples of values of the power reduction factor and the average of radio emissions that minimize the cost function for the time step in the time window, repeated at the time steps in the time window.

6. The method as claimed in claim 2, wherein the cost function is based on:
a first auxiliary function applicable to the average of radio emissions to penalize more radio emissions being farther from an authorized value, and
a second auxiliary function applicable to the power reduction factor to penalize high power reduction factors and smooth out the power reduction factors over time.

7. The method as claimed in claim 6, wherein:
the first auxiliary function penalizes the radio emissions by increasing values of the first auxiliary function as the radio emissions move lower than the authorized value and by increasing values of the first auxiliary function as the radio emissions move higher than the authorized value; and
the second auxiliary function produces outputs that increase, after a starting value of the power reduction factor, in value exponentially as the power reduction factor also increases in value.

8. The method as claimed in claim 2, further comprising:
for a time step starting from a last time step in the time window until a given time step, iteratively backward computing a value of the cost function for the time step for a set of possible values of power reduction factor and selecting the power reduction factor that minimizes the cost function, and
storing the selected power reduction factor for the given time step in association with an average of radio emissions.

9. The apparatus as claimed in claim 1, wherein the instructions, when executed with the at least one processor, cause the apparatus to perform the generating the prediction of the averaged radio emissions over the subsequent time periods in the time window, and the finding couples of values of the power reduction factor the average of radio emissions that minimize the cost function for the first time step in the time window, repeated at the time steps in the time window.

10. The apparatus as claimed in claim 1, wherein the cost function is based on:
a first auxiliary function applicable to the average of radio emissions to penalize more radio emissions being farther from an authorized value, and
a second auxiliary function applicable to the power reduction factor to penalize high power reduction factors and smooth out the power reduction factors over time.

11. The apparatus as claimed in claim 10, wherein:
the first auxiliary function penalizes the radio emissions by increasing values of the first auxiliary function as the radio emissions move lower than the authorized value and by increasing values of the first auxiliary function as the radio emissions move higher than the authorized value; and
the second auxiliary function produces outputs that increase, after a starting value of the power reduction factor, in value exponentially as the power reduction factor also increases in value.

12. The apparatus as claimed in claim 1, wherein the instructions, when executed with the at least one processor, further cause the apparatus to perform:
for a time step starting from a last time step in the time window until a given time step, iteratively backward computing a value of the cost function for the time step for a set of possible values of power reduction factor and selecting the power reduction factor that minimizes the cost function, and
storing the selected power reduction factor for the given time step in association with an average of radio emissions.

13. A base station comprising the apparatus of claim 1, wherein the instructions, when executed with the at least one processor, cause the base station to perform:
obtaining a power reduction policy, and
implementing the power reduction policy during the time period starting at a given time step corresponding to a given time period based on the radio emissions averaged over the time window at the given time step.

14. The base station as claimed in claim 13, wherein the instructions, when executed with the at least one processor, cause the base station to perform:
retrieving a power reduction factor from the power reduction policy based on the given time step and the radio emissions averaged over the time window at the given time step, and applying the retrieved power reduction factor during the given time period.

15. The base station as claimed in claim 13, wherein the instructions, when executed with the at least one processor, cause the base station to perform:
   retrieving a power reduction factor from the power reduction policy based on the given time step and the radio emissions averaged over the time window at the given time step,
   converting the retrieved power reduction factor into a radio emission constraint, and
   ensuring that the radio emissions averaged over the given time period remain under the radio emission constraint.

16. A central entity for use in a radio access network comprising at least one base station, the central entity comprising the apparatus as claimed in claim 1, wherein the instructions, when executed with the at least one processor, cause the central entity to perform obtaining a power reduction policy based at least on the generating the prediction and the finding couples of values and sending the power reduction policy to the base station.

17. The central entity as claimed in claim 16, wherein the instructions, when executed with the at least one processor, cause the central entity at least to perform collecting the radio emissions historical data from base stations in the radio access network.

18. A non-transitory program storage device readable with an apparatus, tangibly embodying a program of instructions executable with the apparatus for performing a method, the method comprising, for radio emissions of a base station over a time window subdivided into a plurality of time periods, each time period starting a corresponding time step, and at least for a first time step that starts a first time period in the time window:
   generating a prediction of averaged radio emissions over subsequent time periods that are subsequent to the first time period in the time window, based on radio emissions historical data, wherein the generating the prediction of averaged radio emissions over subsequent time periods in the time window is further based on an average of radio emissions measured over a previous time period; and
   finding couples of values of a power reduction factor and the average of radio emissions that minimize a cost function for the first time step in the time window, based on the prediction of averaged radio emissions.

* * * * *